United States Patent [19]

Shah

[11] 4,371,901
[45] Feb. 1, 1983

[54] PROGRAMMABLE SIGNAL EQUALIZER

[75] Inventor: Prabodh L. Shah, Denver, Colo.

[73] Assignee: Honeywell Inc., Minneapolis, Minn.

[21] Appl. No.: 197,709

[22] Filed: Oct. 16, 1980

[51] Int. Cl.³ .......................... G11B 5/45; G11B 5/02
[52] U.S. Cl. ........................................ 360/65; 360/67
[58] Field of Search .................................... 360/65, 67

[56] References Cited

U.S. PATENT DOCUMENTS

| | | |
|---|---|---|
| 3,026,480 | 3/1962 | Usher, Jr. . |
| 3,465,321 | 9/1969 | Reisfeld ................................ 360/65 |
| 3,643,013 | 2/1972 | Lemoine . |
| 3,769,606 | 10/1973 | Henegar . |
| 3,867,712 | 2/1975 | Harthill et al. . |
| 3,940,709 | 2/1976 | Heaslett . |
| 4,004,236 | 1/1977 | Cardon et al. . |
| 4,078,215 | 3/1978 | Vinson . |
| 4,110,798 | 8/1978 | Miller et al. ............................ 360/65 |
| 4,297,730 | 10/1981 | Kadowaki et al. ..................... 360/65 |

Primary Examiner—Vincent P. Canney
Attorney, Agent, or Firm—Laurence J. Marhoefer;
Lockwood D. Burton; Mitchell J. Halista

[57] ABSTRACT

A programmable signal equalizer uses a plurality of active RC circuits arranged to be controlled by a ladder resistor network. The resistor ladder circuits are selected by digital word signals representative of the selected magnetic tape speed to produce a signal equalization operation at each of the selected tape speeds. A combination of the ladder network circuits is selected by the digital bits in the digital word to form an active RC circuit producing a signal equalization correlated to a selected tape speed. Using an eleven line digital word code and an eleven RC ladder, eight master speed equalizations are selected as well as seven equalizations between the master speeds for a total of sixty-four equalization functions.

5 Claims, 3 Drawing Figures

PROGRAMMABLE SIGNAL EQUALIZER

BACKGROUND OF THE INVENTION

1. Field Of The Invention

The present invention relates to magnetic tape recorders. More specifically, the present invention is directed to a playback circuit for magnetic tape recordings.

2. Description Of The Prior Art

When data is recorded on a magnetic tape and subsequently reproduced at a preselected tape speed, the amplitude vs. frequency function at the output of the reproduce apparatus is a non-linear characteristic. The characteristic is primarily the result of the read head frequency response and is unique to each tape speed. The prior art solution to this problem which requires linearization of the read head output signal for most applications, including the density digital recording, was to use a separate set of equalization networks for each tape speed. These networks are switched in when a tape speed was selected to a multiple tape speed recorder to provide equalization at that tape speed. Because of the complexity and cost of these traditional equalizer networks, it was common practice to provide only a limited number of tape speed choices usually limited to discrete binary speed steps. Accordingly, it would be desirable to provide a speed orineted equalizer amplifier which provides equalization at the traditional binary speed steps but also at arbitrarily variable size speed steps in between each of the conventional binary speeds of the tape.

DESCRIPTION OF THE INVENTION

An object of the present invention is to provide a programmable equalizer amplifier operative at each of the selected tape speeds in a magnetic tape recorder during reproduction of the magnetic tape.

In accomplishing this and other objects, there has been provided, in accordance with the present invention a programmable equalizer having a plurality of RC networks arranged in a ladder configuration and connected to speed selection lines for selecting of a corresponding combination of the RC networks for each of the selected tape speeds. The speed selection signal is a binary word which is effective to select a corresponding combination of the RC networks for each tape speed.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Detailed Description

Figure 1:
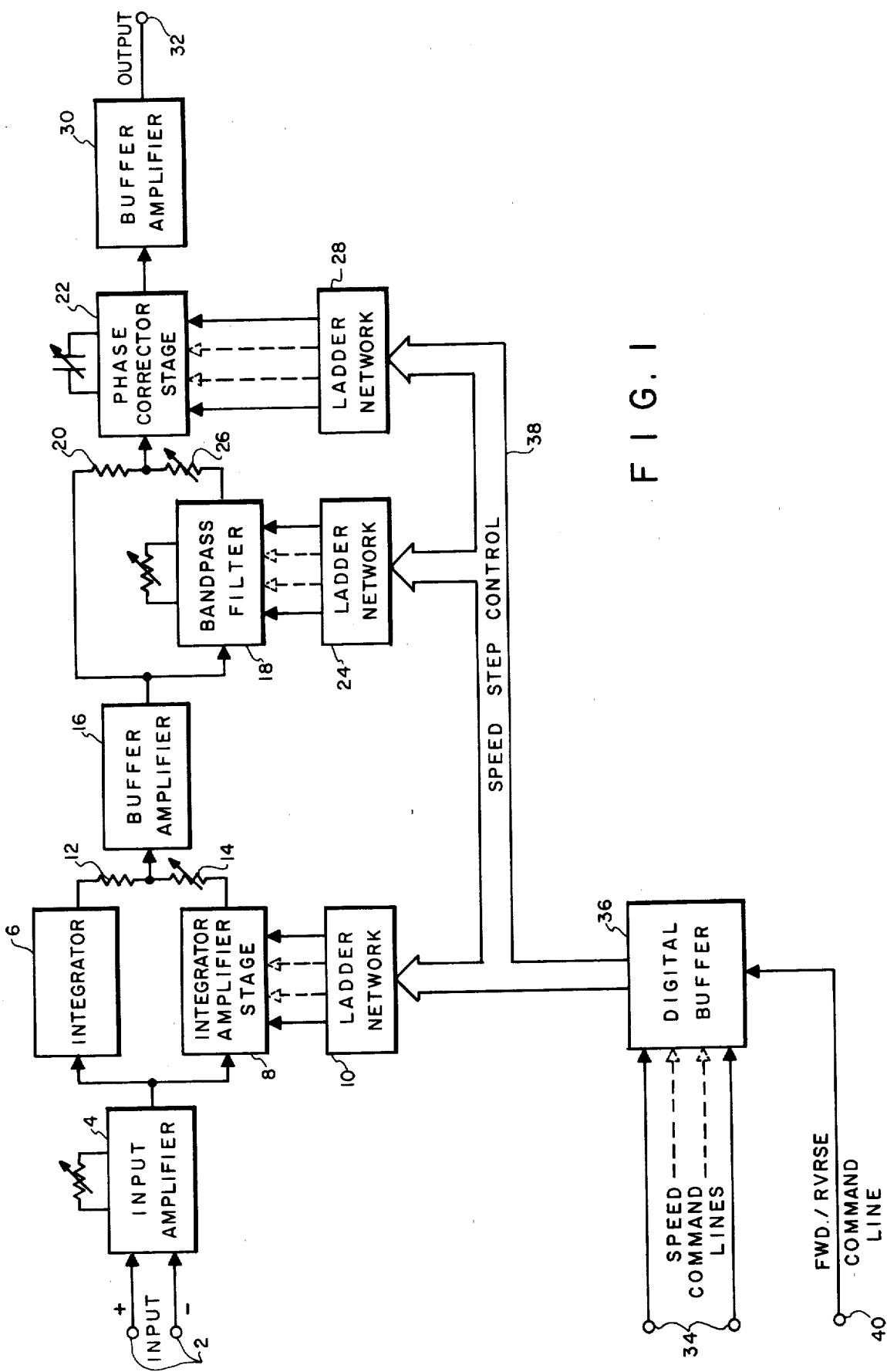
FIG. 1 is a block diagram of an example of an equalizer amplifier system embodying the present invention.

Referring to FIG. 1 in more detail, there is shown a block diagram of a programmable equalizer amplifier embodying an example of the present invention for use in the reproduce or playback circuit of a magnetic tape recorder. The signals from the magnetic tape which are sensed by a magnetic playback used and a preamplifier (not shown) are applied to input terminals 2. The input terminals 2 are connected to an input amplifier 4. The output of the input amplifier 4 is applied concurrently to a conventional integrator 6 and a tape speed controlled integrator amplifier stage 8. The amplifier stage 8 has associated therewith a first tape speed controlled resistor ladder network 10 as described more fully hereinafter. The outputs from the integrator 6 and the integrator amplifier 8 are applied through respective output resistors 12 and 14 to the input of a buffer amplifier 16. The output from the buffer amplifier is applied to the input of an bandpass filter 18 and through a resistor 20 to the input of a phase corrector stage 22. The bandpass filter 18 has associated therewith additional resistor ladder networks shown as a second ladder network 24. The output from the filter 18 is applied through variable resistors 26 to the input of a phase corrector stage 22. The phase corrector stage 22 has associated therewith a third ladder network 28. The output of the phase corrector stage 22 is applied through a buffer amplifier 30 to an output terminal 32. A plurality of speed command or selection lines 34 are applied to the input of a digital buffer 34 for conversion to speed control signals, i.e., digital words, which are applied over a digital bus 38 to the first, second and third ladder networks 10, 24 and 28. A forward/reverse command line 40 is also connected to the digital buffer 36 to supply a signal thereto representative of a selected forward or reverse operation of the tape transport.

Figure 2:
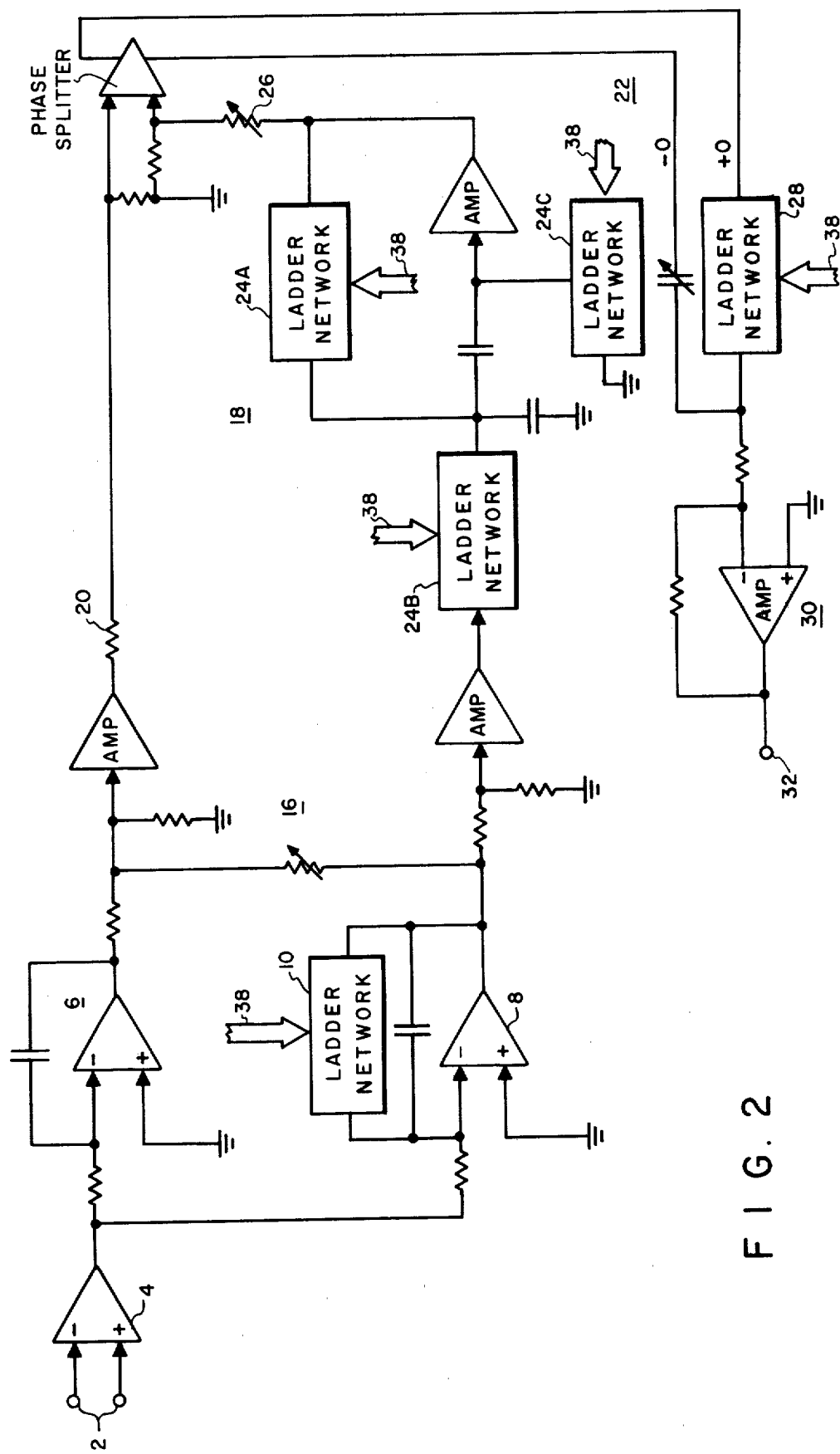
FIG. 2 is a detailed schematic illustration of the system shown in FIG. 1

In FIG. 2, there is shown a detailed schematic illustration of the system shown in FIG. 1. The specific connections of the RC ladders are shown in this illustration. Additionally, the phase corrector stage 22 is shown to include a phase splitter for producing a positive and negative phase output which are recombined after phase correction by the operation of the third resistor ladder 28 and applied to the output amplifier 30 shown as a conventional operational amplifier.

Figure 3:
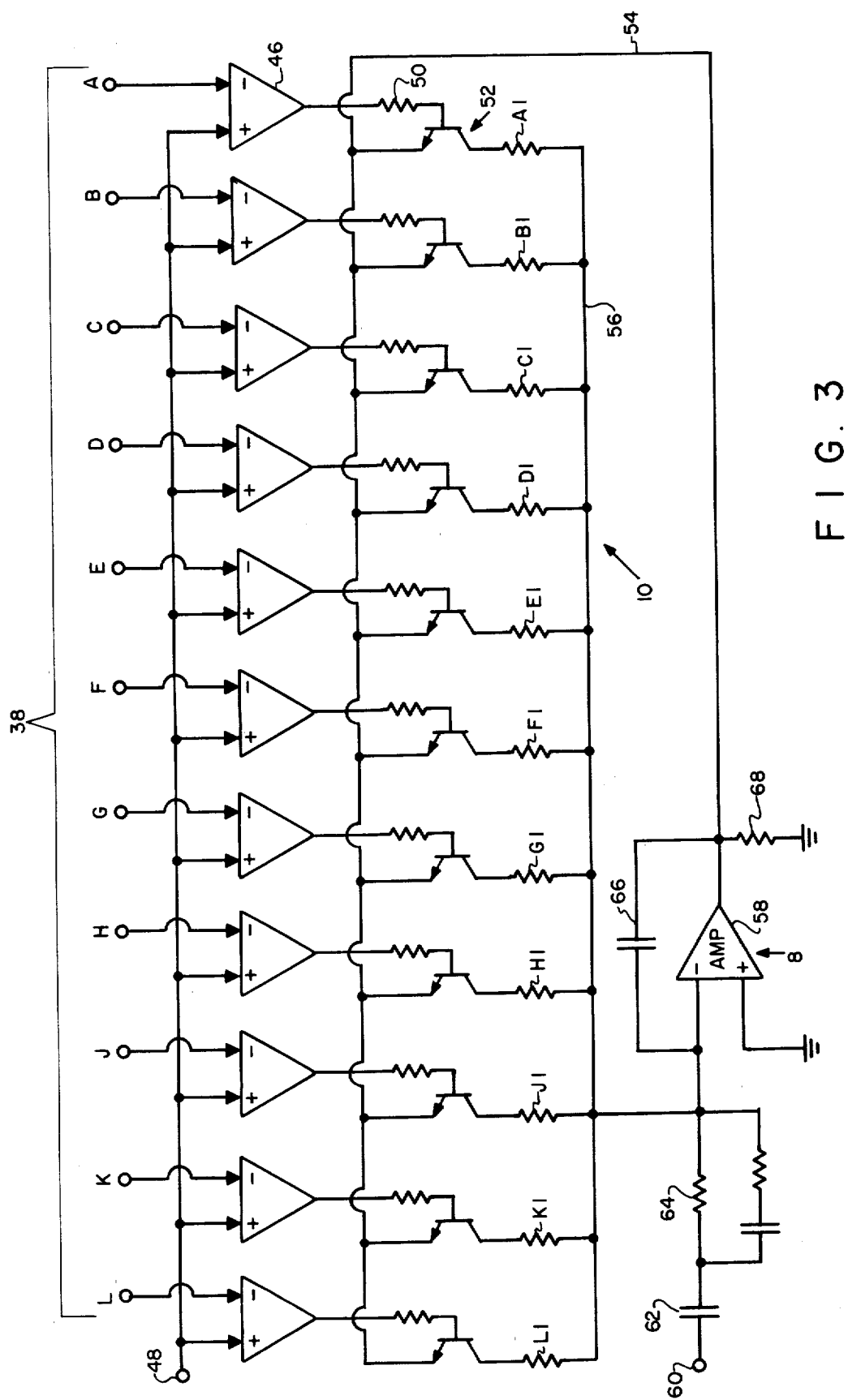
FIG. 3 is a detailed showing of the ladder network having RC elements therein in accordance with the present invention for use in the system shown in FIGS. 1 and 2.

In FIG. 3, there is shown a detailed schematic of a resistor ladder network for use in the system shown in FIG. 1. Specifically, the integrator amplifier stage 8 and the associated ladder network 10 is shown in FIG. 2. The bus 38 is shown as consisting of digital bit input lines A through L with the letter designation I being omitted in produce a total of 11 lines. Each of these digital bit lines is applied to the inverting input of a respective operational amplifier. For example, line A is applied to the inverting input of amplifier 48. Each of the operational amplifiers 46, etc. also are supplied at the non-inverting input thereof a bias signal from bias input terminal 48 connected in common to all of the non-inverting inputs of the amplifiers 46, etc. The output of each of the amplifiers 46, etc. is connected through a corresponding output resistor to the base electrode of a respective transistor switch. For example, amplifier 46 is connected through output resistor 50 to the base electrode of switch transistor 52. All of the output resistors 50, etc. have a common value, e.g., 20K, and all of the switch transistors 52, etc. are the same type, e.g., SPS8285. The emitter electrode of each of the switch transistors 52, etc. is connected to a common output line 54. The collector electrodes of the switch transistors 52, etc. are connected through respective ones of collector resistors A1 to L1 (omitting I1) to a common line 56. The collector resistors for the switch transistors 52, etc. are labeled A1 through L1 to correspond with the A through L inputs from the bus 38. The collector resistors A1 to L1 are specifically selected to provide the novel operation function for the equalizer amplifier of the present invention. The integrator amplifier 8 includes an operational amplifier 58 which has the equalization network 10 connected between its output and an inverting input thereof. An input terminal 60 is connected through an output capacitor 62 and an input resistor 64 to the inverting input of the amplifier 58. A feedback capacitor 66 is connected between the output of the amplifier 58 and the inverting input thereof. The non-inverting input of the amplifier 58 is connected to a ground connection. A common emitter resistor 68 is connected between the common line 54 and ground.

DETAILED DESCRIPTION

The input amplifier 4 is used to provide common mode rejection and gain normalization using differential amplifier phase equalization. The active integrator section including fixed integrator 6 and variable integrator amplifier 8 controlled by ladder network 10 compensates for a signal rise in the read head output, e.g., 6 db/octave. The active bandpass filter section 18 compensates for loss at higher frequencies of the magnetic head output signal primarily due to gap loss. The active phase equalizer or corrector section 22 linearizes the phase shift produced by the bandpass filter. The output amplifier 30 provides a final stage of amplification and output drive for a typical load resistor.

Over a typical speed range of 15/16 ips to 240 ips as well as the traditional (binary related) discrete step operating speeds, the active RC circuits of the present invention provide automatic speed related signal equalization over a continuous tape speed range. Thus, when data is recorded and subsequently reproduced the amplitude versus frequency transfer function at the output of the reproduce head is characterized by a large amplitude variation which is not suitable for most applications. Accordingly, signal equalization circuits are required to linearize the head output by introducing an inverse amplitude versus frequency characteristic. Since there is a unique reproduce head output curve for each speed within the transport operating range, the transfer functions at a give speed are the same for all recorder tracks and furthermore are not related to the individual channel bit rates. Consequently, an equalizer selection based on switching playback speeds provides an optimum playback system. In a typical example, the equalization amplifier system shown in FIGS. 1 and 2 provides sixty-four equalization speed steps to cover the tape speed range from 15/16 ips to 240 ips. The system of the present invention provides eight intermediate steps within each octave speed range for a total of sixty-four speed steps. Typically the programmable equalizer amplifier is aligned or adjusted using the adjustable resistors and capacitors at one mid-range binary speed, and the signal equalization is automatically accomplished for all selectable tape speeds.

An example of a sixty-four speed equalizer amplifier is as follows:

Starting from a base resistance value R, e.g., 137 ohms, at the L input of the speed lines the succeeding resistors in the ladder network are twice the value of the preceding resistor, e.g., 2R, 4R, 8R, etc. A typical speed line digital word versus tape speed variations for one speed octave is as follows:

| Speed | Control Word | Ladder Resistance |
|---|---|---|
| 1⅞ ips | 11101111111 | 128R |
| +12.5% | 01101111111 | 114R |
| +25% | 10101111111 | 102R |
| +37.5% | 00101111111 | 93.1R |
| +50% | 11001111111 | 85.3R |
| +62.5% | 01001111111 | 78.5R |
| +75% | 10001111111 | 73.1R |
| +87.5% | 00001111111 | 68.3R |
| 3¾ ips | 11110111111 | 64R |

In each of the equalizer active RC sections, i.e., the integrator section, the bandpass filter section and the phase corrector or equalizer section, the respective transfer functions indicate that the frequency shift is dependent on the equivalent resistance of the ladder networks. In other words, the frequency is an inverse function of the equivalent resistance of the ladder networks. Examining the above table, the reciprocal of the ladder network equivalent resistance increases linearly with speed by a factor of two between each increment in master or octave speeds and in 12.5% increments for each increment in the in-between speeds to achieve the desired equalizer operation.

Accordingly, it may be seen, that there has been provided in accordance with the present invention an improved equalizer amplifier for compensating magnetic tape playback signals at any selectable tape speed.

The embodiments of the invention is which an exclusive property or privilege is claimed are defined as follows:

1. An equalizer amplifier for amplifying an output of a reproduce head in a data recorder having a moving recording medium driven past said reproduce head at a selected one of a plurality of recording medium speeds comprising
  a plurality of active RC circuits arranged in a serial circuit, said RC circuits including an integrator circuit, a bandpass filter circuit and a phase corrector circuit,
  a separate programmable resistor ladder network for each of said RC circuits, said network having digital word selectable switches for altering the equivalent resistance of the ladder network and
  means for concurrently applying to all of said ladder networks a digital word arranged to selectively operate said switches in response to a selected one of the recording medium speeds.

2. An equalizer amplifier as set forth in claim 1 wherein said ladder network includes resistors each having resistance values which are double the resistance value of a preceding resistor in the network starting from a base resistance value.

3. An equalizer amplifier as set forth in claim 2 wherein said resistors and said switches are each eleven in number and the digital word is an eleven bit digital word.

4. An equalizer amplifier as set forth in claim 3 wherein said RC circuits include an integrator, a bandpass filter and a phase corrector.

5. An equalizer amplifier as set forth in claim 1 wherein said recorder is a magnetic tape recorder and said reproduce head is a magnetic reproduce head.

* * * * *